US006337157B1

(12) United States Patent
Shirakawa et al.

(10) Patent No.: US 6,337,157 B1
(45) Date of Patent: *Jan. 8, 2002

(54) CATHODE ELECTROACTIVE MATERIAL, PRODUCTION METHOD AND NONAQUEOUS SECONDARY BATTERY COMPRISING THE SAME

(75) Inventors: Akihiko Shirakawa; Takao Noda, both of Chiba (JP)

(73) Assignee: Showa Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,599

(22) Filed: May 27, 1998

Related U.S. Application Data

(60) Provisional application No. 60/065,472, filed on Nov. 19, 1997.

(30) Foreign Application Priority Data

May 28, 1997 (JP) .............................................. 9-154473
Jul. 10, 1997 (JP) .............................................. 9-200785

(51) Int. Cl.[7] .................................................. H01M 4/50
(52) U.S. Cl. ......................................... 429/224; 423/599
(58) Field of Search ........................... 429/224; 423/599

(56) References Cited

U.S. PATENT DOCUMENTS 4,980,251 A * 12/1990 Thackeray et al. ......... 429/224
5,316,877 A * 5/1994 Thackeray et al. ......... 429/107
5,425,932 A * 6/1995 Tarascon ..................... 423/599
5,700,442 A * 12/1997 Bloch et al. ................ 423/599
5,702,679 A * 12/1997 Sheargold et al. .......... 423/599
5,718,877 A * 2/1998 Manev et al. ............... 423/599
5,866,279 A * 2/1999 Wada et al. ................ 429/224

OTHER PUBLICATIONS

Kingery, "Introduction to Ceramics", John Wiley and Sons, pp. 416–417. (No month available.), 1967.*

* cited by examiner

*Primary Examiner*—Carol Chaney
(74) *Attorney, Agent, or Firm*—Sughrue Mion, PLLC

(57) ABSTRACT

A cathode electroactive material is disclosed, comprising a compound oxide having a spinel structure. The compound oxide comprises lithium, manganese and oxygen and has an atomic ratio of lithium to manganese of Li/Mn=0.48 to 0.55, a true density of 4.05 g/cm$^3$ or more and a lattice constant of 8.240 Å or less. The compound oxide is obtained by mixing a lithium compound with manganese carbonate having a specific surface area of 10 m$^2$/g or more, then reacting the mixture at a temperature of from 350 to 680° C. for at least one hour, and heat-treating the resulting spinel structure compound oxide at a temperature of from 730 to 900° C. Also disclosed is a nonaqueous secondary battery comprising the cathode electroactive material.

9 Claims, 1 Drawing Sheet

Strength (counts)
12000
10000
8000
6000
4000
2000
0
20.000
40.000
60.000
80.000
2θ [°]

CATHODE ELECTROACTIVE MATERIAL, PRODUCTION METHOD AND NONAQUEOUS SECONDARY BATTERY COMPRISING THE SAME

CROSS REFERENCE TO RELATED APPLICATIONS

This application is an application filed under 35 U.S.C. §111 (a) claiming benefit pursuant to 35 U.S.C. §119(e) (1) of the filing date of the Provisional Application No. 60/065,472 filed Nov. 19, 1997 pursuant to 35 U.S.C. §111(b).

FIELD OF THE INVENTION

The present invention relates to a lithium-manganese compound oxide having a spinel structure having reduced lattice defects. The inventive compound oxide is useful as a cathode electroactive material in a lithium battery having a large initial capacity and which exhibits a small reduction in capacity even when repeatedly charged and discharged. The present invention further relates to a production method thereof, and a nonaqueous second battery using the inventive compound oxide as a cathode electroactive material.

BACKGROUND OF THE INVENTION

As a cathode electroactive material of a nonaqueous secondary battery, particularly of a high energy density-type nonaqueous secondary battery, $LiCoO_2$, $LiNiO_2$ and/or a spinel structure compound oxide comprising lithium, manganese and oxygen have been proposed. $LiCoO_2$ is disadvantageous in that it is expensive and there is a restriction in obtaining the raw materials therefor, and $LiNiO_2$ is disadvantageous in that stable production is difficult. Accordingly, there is a need to develop a lithium-manganese spinel structure compound oxide (hereinafter referred to as a manganese-base cathode electroactive material) which is inexpensive yet provides good performance.

When a nonaqueous secondary battery using a manganese-base cathode electroactive material is repeatedly charged and discharged, the capacity is disadvantageously greatly reduced after a small number of charging and discharging cycles. Furthermore, there is a problem in that the practical capacity of the nonaqueous secondary battery is considerably lower than its theoretical capacity based on the composition of the manganese-base cathode electroactive material.

In order to solve these problems, a manganese-base cathode electroactive material having a composition where lithium is added in excess has been proposed, and a battery including this manganese-base cathode electroactive material exhibits a smaller reduction in battery capacity as compared with the initial battery capacity even when charging and discharging are repeated. However, this technique is deficient in that because lithium is added in excess to the manganese-base cathode electroactive material, the initial capacity is reduced as compared with conventional batteries, although the reduction ratio is small (see, JP-A-2-270268 (the term "JP-A" as used herein means an "unexamined published Japanese patent application")).

A cathode electroactive material for nonaqueous secondary batteries having a large initial capacity is obtained by synthesizing a manganese-base electroactive material at a low temperature. However, this manganese-base cathode electroactive material has low crystallinity and a large specific surface area, and therefore is disadvantageous in that although the initial capacity is large, the capacity is greatly reduced upon repeated charging and discharging (see, British Patent Publication No. 2,221,213A).

It has also been proposed to obtain a manganese-base cathode electroactive material from manganese dioxide having a specific surface area of 80 $m^2/g$ or more as a manganese compound, and to use this as a cathode electroactive material for a nonaqueous secondary battery (see, JP-A-6-275276). The manganese-base cathode electroactive material obtained by this method, however, has a true density of only about 4.00 $g/cm^3$ and therefore, a nonaqueous secondary battery having a large initial capacity cannot be obtained. Also, the capacity is greatly reduced after a small number of charging and discharging cycles. Accordingly, this material is not yet suitable as a cathode electroactive material of a battery for practical use.

SUMMARY OF THE INVENTION

It is therefore an object of the present invention to develop a cathode electroactive material for use in a nonaqueous secondary battery including an anode comprising lithium, a lithium alloy or a material capable of doping or undoping lithium and a nonaqueous electrolyte containing a lithium salt, which can provide an initial capacity close to its theoretical capacity based on the composition of the cathode electroactive material and which exhibits a small reduction in capacity even when charging and discharging cycles are repeated many times. It is furthermore an objective of the present invention to develop a production method thereof and a nonaqueous secondary battery using this cathode electroactive material.

The above objects of the present invention have been attained by providing:

(1) a cathode electroactive material comprising a compound oxide having a spinel structure, said compound oxide comprising lithium, manganese and oxygen and having an atomic ratio of lithium to manganese of Li/Mn=0.48 to 0.55, a true density of 4.05 $g/cm^3$ or more and a lattice constant of 8.240 Å or less;

(2) a cathode electroactive material comprising a compound oxide having a spinel structure, said compound oxide comprising lithium, manganese and oxygen and having an atomic ratio of lithium to manganese of Li/Mn=0.51 to 0.55, a true density of 4.05 $g/cm^3$ or more and a lattice constant of 8.240 Å or less;

(3) a method for producing a cathode electroactive material comprising a compound oxide having a spinel structure, said compound oxide comprising lithium, manganese and oxygen and having an atomic ratio of lithium to manganese of Li/Mn=0.48 to 0.55, a true density of 4.05 $g/cm^3$ or more and a lattice constant of 8.240 Å or less, which comprises mixing a lithium compound with manganese carbonate having a specific surface area of 10 $m^2/g$ or more, reacting the mixture at a temperature of from 350 to 680° C. for at least one hour, and heat-treating the resulting spinel structure compound oxide at a temperature of from 730 to 900° C.;

(4) a method for producing a cathode electroactive material comprising a compound oxide having a spinel structure, said compound oxide comprising lithium, manganese and oxygen and having an atomic ratio of lithium to manganese of Li/Mn=0.51 to 0.55, a true density of 4.05 $g/cm^3$ or more and a lattice constant of 8.240 Å or less, which comprises mixing a lithium compound with manganese carbonate having a specific surface area of 10 $m^2/g$ or more, reacting the mixture at a temperature of from 350 to 680° C. for at least one hour, and heat-treating the resulting spinel structure compound oxide at a temperature of from 730 to 900° C.;

(5) the method for producing a cathode electroactive material as described in (3) or (4) above, which comprises reacting said mixture of a lithium compound and manganese carbonate at a temperature of from 500 to 650° C. for from 2 to 40 hours and heat-treating the resulting spinel structure compound oxide at a temperature of from 750 to 850° C. for from 5 to 30 hours;

(6) a nonaqueous secondary battery comprising the cathode electroactive material described in (1) or (2) above; and (7) a nonaqueous secondary battery comprising the cathode electroactive material as produced by the production method described in any one of (3) to (5) above.

DESCRIPTION OF THE PREFERRED EMBODIMENTS

Figure 1:
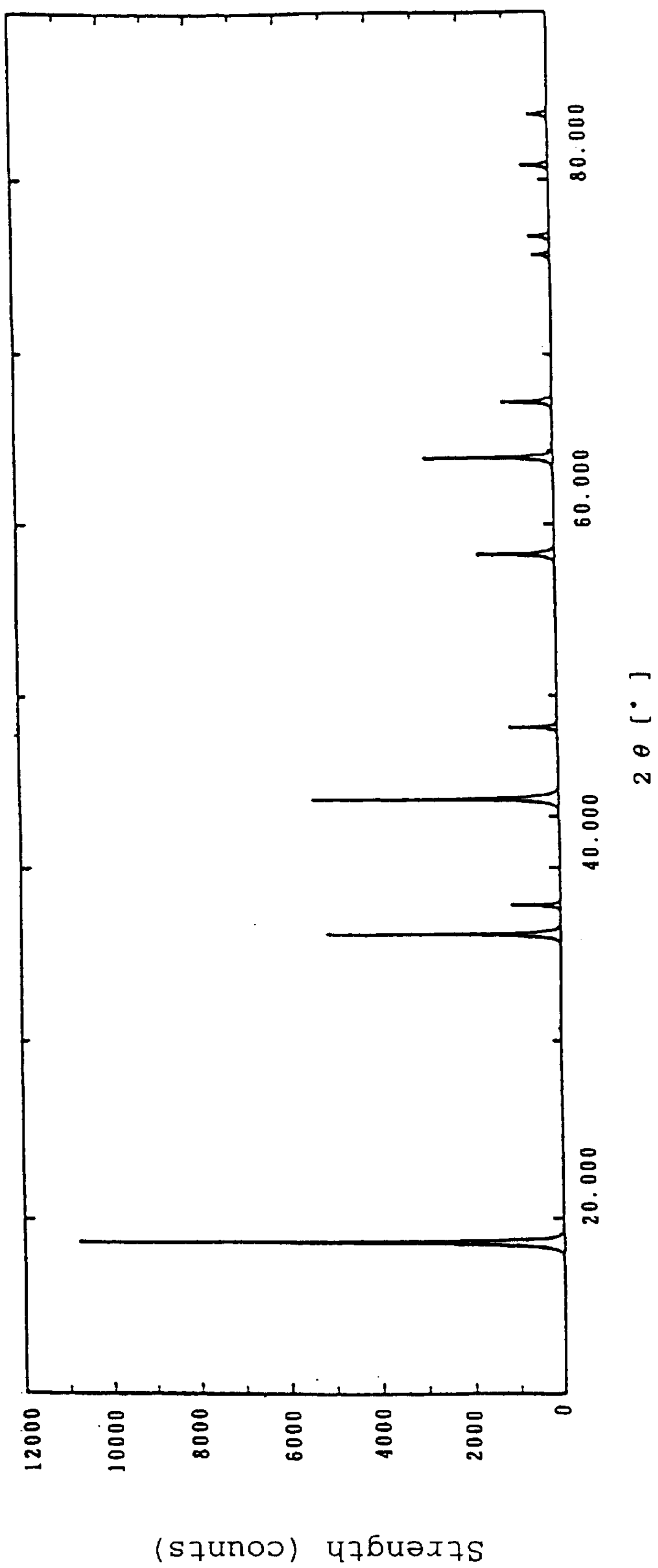
FIG. 1 shows an X-ray diffraction chart (CuKα) of the manganese-base cathode electroactive material of Example 1 of the present invention.

As a result of extensive investigations on the production method of a spinel structure compound oxide, the present inventors have succeeded in synthesizing a spinel structure compound oxide having a true density close to its theoretical density. At the same time, the present inventors also found that although some inversion phenomenon may occur, in general, as the Li/Mn ratio decreases the lattice constant tends to increase, and as the Li/Mn ratio increases the lattice constant tends to decrease.

In using this spinel structure compound oxide as the cathode electroactive material of a lithium-base nonaqueous secondary battery, there is a problem in that when the lattice constant is excessively large, the battery has a large initial discharge capacity but the capacity is greatly reduced by repeatedly charging and discharging. On the other hand, when the lattice constant is excessively small, a reduction in discharge capacity can be prevented but the initial discharge capacity is disadvantageously small.

However, the present inventors found that when this spinel structure compound oxide has a Li/Mn ratio of from 0.48 to 0.55, preferably from 0.51 to 0.53, the nonaqueous secondary battery thus obtained not only has a large initial capacity but also loses very little capacity even when the charging and discharging cycles are repeated many times.

A lithium-manganese spinel structure compound oxide having an Li/Mn ratio of 0.50 has a theoretical density of 4.28 g/cm$^3$, however, according to the production method of the present invention, a spinel structure compound oxide having a true density of 4.05 g/cm$^3$ or more, preferably 4.20 g/cm$^3$ or more, and a lattice constant of 8.240 Å or less, preferably 8.235 Å or less, can be readily obtained. When a spinel structure compound oxide having a Li/Mn ratio of from 0.51 to 0.53 is used as a cathode electroactive material of a lithium secondary battery, a battery having excellent characteristics can be obtained.

The manganese-base cathode electroactive material of the present invention can be obtained by mixing a lithium compound with manganese carbonate having a specific surface area of 10 m$^2$/g or more at an objective Li/Mn ratio, reacting the mixture at a temperature of from 350 to 680° C. for at least one hour to produce a lithium-manganese spinel structure compound oxide, and heat-treating the resulting compound oxide at a temperature of from 730 to 900° C.

The manganese compound for use in the present invention is most preferably manganese carbonate because the reaction proceeds at a lower temperature than with an oxide-base compound such as manganese dioxide ($MnO_2$) or manganese sesquioxide ($Mn_2O_3$) Moreover, with a manganese salt such as manganese nitrate [$Mn(NO_3)_2$] or manganese sulfate ($MnSO_4$), a gas such as $NO_x$ or $SO_x$ is generated during the reaction and a manganese-base cathode electroactive material having a high true density cannot be obtained.

The lithium compound is not particularly limited, however, lithium carbonate, lithium hydroxide and lithium nitrate are preferred.

According to the ASTM card (35-782), conventionally known manganese-base cathode electroactive materials have a lattice constant "a" of 8.24762 Å and a theoretical density $D_x$ of 4.281 g/cm$^3$. However, the true density of conventionally obtained manganese-base cathode electroactive materials is lower than the theoretical density and is at most 4.0 g/cm$^3$ (see, 37-*Kai Denchi To'ron-Kai Ko'en Yo'shi-Shu* (*37th Battery Discussion Lecture Abstracts*), pp. 199–200).

The measured true density of the manganese-base cathode electroactive material does not change even if it is crushed or pulverized. Thus, the low true density of manganese-base cathode electroactive materials obtained by conventional methods is ascribable to a large number of crystal lattice defects.

Accordingly, it is duly considered that conventional nonaqueous secondary batteries using such a manganese-base cathode electroactive material containing a large number of crystal lattice defects have a low initial capacity due to the lattice defects and undergo a large reduction in capacity upon repeated charging and discharging.

Even when the true density is 4.05 g/cm$^3$ or more, if the lattice constant exceeds 8.240 Å, the crystal is readily collapsed because the spinel structure crystal considerably expands or shrinks at the time of charging or discharging. Therefore, when charging and discharging are repeated many times, the capacity is greatly reduced and the desired cathode electroactive material cannot be obtained.

In the case of using manganese oxide or manganese carbonate having a specific surface area of less than 10 m$^2$/g as the manganese material, the manganese-base cathode electroactive material exhibits low reactivity and is necessarily reacted at a high temperature. As a result, a large number of crystal lattice defects are generated such that the true density is reduced.

In view of reactivity, a larger specific area is preferred. However, as the specific surface area increases, the particles more readily coagulate and uniform mixing is more difficult to attain. In particular, the ability of the particles to coagulate greatly increases in the vicinity of about 100 m$^2$/g, and a specific surface area on this order is the limit. If the specific surface area exceeds about 100 m$^2$/g, a non-uniform compound oxide is produced and this is not desirable.

The manganese-base cathode electroactive material produced by the method of the present invention has a true density close to its theoretical density, and therefore is considered to contain almost no crystal lattice defects. As a result, the nonaqueous secondary battery obtained using this manganese-base cathode electroactive material can provide a high initial capacity. Furthermore, even when charging and discharging are repeated, the reduction in capacity can be small.

If the Li/Mn ratio is less than 0.48, excess manganese is converted to electrochemically inactive $Mn_2O_3$ and the capacity is reduced, whereas if the Li/Mn ratio exceeds 0.55, excess lithium is displaced by electrochemically active trivalent manganese and the capacity is reduced.

According to the method for producing a manganese-base cathode electroactive material of the present invention a lithium compound and manganese carbonate having a specific surface area of 10 $m^2/g$ or more are mixed, the mixture is reacted at a temperature of from 350 to 680° C. for at least one hour, preferably at a temperature of from 500 to 650° C. for from 2 to 40 hours, to produce a lithium-manganese spinel structure compound oxide, and then the compound oxide thus obtained is further heat-treated at a temperature of from 730 to 900° C., preferably from 750 to 850° C., for from 5 to 30 hours.

Accordingly, it is also possible to carry out a complete reaction while maintaining a temperature of from 350 to 680° C. for at least one hour, preferably from 500 to 650° C. for from 2 to 40 hours, and then elevating to a temperature of from 730 to 900° C. to carry out the heat-treatment.

If the reaction temperature of the mixture is less than 350° C., the reaction does not proceed at a preferred rate and a spinel structure compound oxide cannot be obtained. On the other hand, if the reaction is carried out at a temperature exceeding 680° C., manganese mingles in the lithium site of the spinel structure to cause many crystal lattice defects and only a manganese-base cathode electroactive material having a low true density can be obtained.

Even when the reaction temperature is controlled within the specified range, if the reaction time is less than one hour, the reaction does not proceed sufficiently and a spinel structure compound oxide cannot be obtained.

Under these reaction conditions on heating, a lithium-manganese spinel structure compound oxide can be obtained, however, a true density of 4.05g/$cm^3$ or more and a lattice constant of 8.240 Å or less is still difficult to achieve. Accordingly, the spinel structure compound oxide obtained by reaction under heating is heat-treated at a temperature of from 730 to 900° C., preferably from 750 to 850° C., for from 5 to 30 hours to improve crystallinity.

The heat-treatment is effectively performed in this temperature region preferably for 5 hours or more, more preferably for 10 hours or more. If the heat-treatment time is too short, the heat-treatment hardly contributes to improving the true density and a spinel structure compound oxide having a true density of 4.05 g/$cm^3$ or more and a lattice constant of 8.240 Å or less cannot be obtained. On the other hand, if the heat-treatment time exceeds 30 hours, there is a risk of volatilizing Li to reduce the Li/Mn ratio lower than the objective ratio and this is not desirable.

The lithium-manganese spinel structure compound oxide obtained by reacting in the temperature region of from 350 to 650° C. is preferably crushed or pulverized once and then heat-treated. The clear mechanism therefor is not known, however, it is considered that by crushing or pulverizing the compound oxide thus produced, unreacted compounds can be re-dispersed and completely reacted in the heat-treatment process.

In the method of the present invention, because a lithium-manganese spinel structure compound oxide is produced by previously carrying out the reaction at a low temperature, even when it is heat-treated at a temperature of from 730 to 900° C., mingling of manganese in the lithium site of the crystal lattice is deemed not to occur such that only crystallization proceeds. As a result, crystal lattice defects are reduced, and a manganese-base cathode electroactive material having a high true density can be obtained.

EXAMPLES

The cathode electroactive material of the present invention and a nonaqueous secondary battery employing the same are described in detail below by reference to the following Examples and Comparative Examples. However, the present invention should not be construed as being limited thereto.

Example 1

0.500 mole of manganese carbonate (specific surface area by BET: 30 $m^2/g$) and 0.128 mole of lithium carbonate (specific surface area by BET: 1 $m^2/g$) were mixed in a 0.7 l-volume ball mill for one hour and reacted in air at a reaction temperature of 650° C. for 4 hours.

The reaction product was crushed in a ball mill for one hour and then heat-treated in air at a heat treatment temperature of 750° C. for 20 hours. The lithium content of the heat-treated manganese-base cathode electroactive material was measured by flame photometry and the amount of manganese was also measured by EDTA titration to determine the Li/Mn atomic ratio.

The true density of the heat-treated manganese-base cathode electroactive material was determined by a pycnometer method using a true density measuring device (Auto-True Denser MAT-5000, manufactured by Seishin Kigyo).

The lattice constant of the cathode electroactive material was determined by the method of J. B. Nelson and D. P. Riley (see, *Proc. Phys. Soc.*, 57, 160 (1945)).

Using the cathode electroactive material thus obtained, a coin-type battery was manufactured as follows.

The cathode electroactive material, carbon black as an electrically conductive agent and ethylene tetrafluoride resin were mixed at a weight ratio of 80:10:10. The resulting mixture was formed under pressure on a collector comprising an aluminum expanded metal and used as a cathode. As the anode, a lithium foil having a predetermined thickness was used. An electrolytic solution was prepared by mixing propylene carbonate and dimethyl carbonate at a volume ratio of 1:2 and dissolving $LiPF_6$ into the mixed solution at a concentration of 1 mole/l. Using the cathode, anode, a polypropylene separator and the electrolytic solution thus prepared, a Model 2016 coin-type battery was manufactured.

The thus-manufactured battery was subjected to a charge-discharge cycling test by repeatedly charging and discharging under conditions of a current density of 0.5 mA/$cm^2$ and a voltage range of from 3.0 to 4.4 V. The initial discharge capacity and the discharge capacity after 30 cycles are shown in Table 1.

Examples 2 to 4

A cathode electroactive material was produced and evaluated in the same manner as in Example 1, except for changing the reaction temperature in producing the cathode electroactive material. The results are shown in Table 1.

Examples 5 and 6

A cathode electroactive material was produced and evaluated in the same manner as in Example 1, except for changing the heat-treatment temperature in producing the cathode electroactive material. The results are shown in Table 1.

Examples 7 to 10

A cathode electroactive material was produced and evaluated in the same manner as in Example 1, except for changing the atomic mixing ratio in producing the cathode electroactive material. The results are shown in Table 1.

Examples 11 to 14

A cathode electroactive material was produced and evaluated in the same manner as in Example 1, except for changing the reaction temperature and reaction time in producing the cathode electroactive material. The results are shown in Table 1.

Examples 15 to 17

A cathode electroactive material was produced and evaluated in the same manner as in Example 1, except for changing the heat treatment time in producing the cathode electroactive material. The results are shown in Table 1.

Example 18

A cathode electroactive material was produced and evaluated in the same manner as in Example 1, except for using manganese carbonate having a specific surface area by the BET method of 80 $m^2/g$ as the manganese material and by performing the reaction at 500° C. for 50 hours in producing the cathode electroactive material. The results are shown in Table 1.

Example 19

A cathode electroactive material was produced and evaluated in the same manner as in Example 1, except for using manganese carbonate having a specific surface area by the BET method of 80 $m^2/g$ as the manganese material and by changing the reaction time to 2 hours in producing the cathode electroactive material. The results are shown in Table 1.

Example 20

A cathode electroactive material was produced and evaluated in the same manner as in Example 1, except for using manganese carbonate having a specific surface area by the BET method of 12 $m^2/g$ as the manganese material in producing the cathode electroactive material. The results are shown in Table 1.

Comparative Example 1

A cathode electroactive material was produced and evaluated in the same manner as in Example 1, except for using electrolytic manganese dioxide having a specific surface area by the BET method of 15 $m^2/g$ as the manganese material in producing the cathode electroactive material. The results are shown in Table 1.

Comparative Example 2

A cathode electroactive material was produced and evaluated in the same manner as in Example 1, except for using electrolytic manganese dioxide having a specific surface area by the BET method of 80 $m^2/g$ as the manganese material and by performing the reaction at 500° C. for 80 hours in producing the cathode electroactive material. The results are shown in Table 1.

Comparative Example 3

A cathode electroactive material was produced and evaluated in the same manner as in Example 1, except for using manganese sesquioxide having a specific surface area by the BET method of 5 $m^2/g$ as the manganese material in producing the cathode electroactive material. The results are shown in Table 1.

Comparative Example 4

A cathode electroactive material was produced and evaluated in the same manner as in Example 1, except for changing the reaction temperature to 600° C. and omitting the heat treatment in producing the cathode electroactive material. The results are shown in Table 1.

Comparative Example 5

A cathode electroactive material was produced and evaluated in the same manner as in Example 1, except for omitting the heat treatment in producing the cathode electroactive material. The results are shown in Table 1.

Comparative Example 6

A cathode electroactive material was produced and evaluated in the same manner as in Example 1, except for changing the reaction time to 20 hours and omitting the heat treatment in producing the cathode electroactive material. The results are shown in Table 1.

Comparative Example 7

A cathode electroactive material was produced and evaluated in the same manner as in Example 1, except for changing the reaction temperature to 750° C., changing the reaction time to 20 hours and omitting the heat treatment in producing the cathode electroactive material. The results are shown in Table 1.

Comparative Example 8

A cathode electroactive material was produced and evaluated in the same manner as in Example 1, except for using manganese carbonate having a specific surface area by the BET method of 8 $m^2/g$ as the manganese material in producing the cathode electroactive material. The results are shown in Table 1.

Comparative Example 9

A cathode electroactive material was produced and evaluated in the same manner as in Example 7, except for changing the heat treatment time to 100 hours. The results are shown in Table 1.

TABLE 1

| | Mn Source (BET $m^2/g$) | Atomic Mixing Ratio Li/Mn | Reaction Conditions Temperature ° C. | Reaction Conditions Time | Heat Treatment Conditions Temperature ° C. | Heat Treatment Conditions Time | Molar ratio Li/Mn after Heat Treatment | True Density after Heat Treatment $g/cm^3$ | Lattice Constant Å | Discharge Capacity mAh/g Initial | Discharge Capacity mAh/g After 30 Cycles |
|---|---|---|---|---|---|---|---|---|---|---|---|
| Example | | | | | | | | | | | |
| 1[1] | $MnCO_3$ (30) | 0.51 | 650 | 4 | 750 | 20 | 0.51 | 4.23 | 8.231 | 136 | 132 |
| 2[2] | $MnCO_3$ (30) | 0.51 | 600 | 4 | 750 | 20 | 0.51 | 4.19 | 8.231 | 132 | 126 |
| 3 | $MnCO_3$ (30) | 0.51 | 500 | 4 | 750 | 20 | 0.51 | 4.14 | 8.231 | 130 | 124 |
| 4 | $MnCO_3$ (30) | 0.51 | 400 | 4 | 750 | 20 | 0.51 | 4.11 | 8.231 | 121 | 115 |
| 5 | $MnCO_3$ (30) | 0.51 | 650 | 4 | 800 | 20 | 0.51 | 4.20 | 8.231 | 135 | 127 |
| 6 | $MnCO_3$ (30) | 0.51 | 650 | 4 | 850 | 20 | 0.50 | 4.18 | 8.235 | 133 | 121 |
| 7 | $MnCO_3$ (30) | 0.49 | 650 | 4 | 750 | 20 | 0.49 | 4.25 | 8.240 | 139 | 130 |
| 8 | $MnCO_3$ (30) | 0.50 | 650 | 4 | 750 | 20 | 0.50 | 4.24 | 8.235 | 138 | 132 |
| 9 | $MnCO_3$ (30) | 0.53 | 650 | 4 | 750 | 20 | 0.53 | 4.17 | 8.221 | 130 | 128 |
| 10 | $MnCO_3$ (30) | 0.55 | 650 | 4 | 750 | 20 | 0.55 | 4.13 | 8.214 | 125 | 122 |
| 11 | $MnCO_3$ (30) | 0.51 | 650 | 20 | 750 | 20 | 0.51 | 4.24 | 8.231 | 138 | 134 |
| 12 | $MnCO_3$ (30) | 0.51 | 600 | 40 | 750 | 20 | 0.51 | 4.25 | 8.231 | 138 | 135 |
| 13 | $MnCO_3$ (30) | 0.51 | 500 | 80 | 750 | 20 | 0.51 | 4.13 | 8.230 | 128 | 122 |
| 14 | $MnCO_3$ (30) | 0.51 | 400 | 50 | 750 | 20 | 0.51 | 4.13 | 8.230 | 122 | 115 |
| 15 | $MnCO_3$ (30) | 0.51 | 650 | 4 | 750 | 5 | 0.51 | 4.12 | 8.231 | 132 | 120 |
| 16 | $MnCO_3$ (30) | 0.51 | 650 | 4 | 750 | 10 | 0.51 | 4.20 | 8.231 | 134 | 127 |
| 17 | $MnCO_3$ (30) | 0.51 | 650 | 4 | 750 | 30 | 0.51 | 4.24 | 8.231 | 136 | 133 |
| 18 | $MnCO_3$ (80) | 0.51 | 500 | 50 | 750 | 20 | 0.51 | 4.20 | 8.230 | 133 | 127 |
| 19 | $MnCO_3$ (80) | 0.51 | 650 | 2 | 750 | 20 | 0.51 | 4.22 | 8.231 | 137 | 134 |
| 20 | $MnCO_3$ (12) | 0.51 | 650 | 4 | 750 | 20 | 0.51 | 4.07 | 8.231 | 129 | 121 |
| Comparative Example | | | | | | | | | | | |
| 1 | $MnO_2$ (15) | 0.51 | 650 | 4 | 750 | 20 | 0.51 | 4.00 | 8.231 | 111 | 92 |
| 2 | $MnO_2$ (80) | 0.51 | 500 | 80 | 750 | 20 | 0.51 | 4.03 | 8.230 | 118 | 104 |
| 3 | $Mn_2O_3$ (5) | 0.51 | 650 | 4 | 750 | 20 | 0.51 | 3.98 | 8.231 | 105 | 86 |
| 4 | $MnCO_3$ (30) | 0.51 | 600 | 4 | — | — | 0.51 | 4.04 | 8.232 | 82 | 62 |
| 5 | $MnCO_3$ (30) | 0.51 | 650 | 4 | — | — | 0.51 | 4.02 | 8.231 | 96 | 79 |
| 6 | $MnCO_3$ (30) | 0.51 | 650 | 20 | — | — | 0.51 | 3.96 | 8.231 | 102 | 94 |
| 7 | $MnCO_3$ (30) | 0.51 | 750 | 20 | — | — | 0.51 | 3.92 | 8.231 | 126 | 113 |
| 8 | $MnCO_3$ (8) | 0.51 | 650 | 4 | 750 | 20 | 0.51 | 4.02 | 8.231 | 113 | 103 |
| 9 | $MnCO_3$ (30) | 0.49 | 650 | 4 | 750 | 100 | 0.47 | 4.18 | 8.245 | 135 | 98 |

[1]Specific surface area of heat-treated manganese-base cathode electroactive material: 4.2 $m^2/g$
[2]Specific surface area of heat-treated manganese-base cathode electroactive material: 3.3 $m^2/g$ In the present invention, a lithium compound and manganese carbonate having a specific surface area of 10 $m^2/g$ or more are mixed and reacted at a temperature of from 350 to 680° C. to produce a spinel structure compound oxide, and the resulting spinel structure compound oxide is heat-treated at a temperature of from 730 to 900° C. As a result, a spinel structure compound oxide comprising lithium, manganese and oxygen and having an atomic ratio of lithium to manganese of Li/Mn=0.48 to 0.55, a true density of 4.05 $g/cm^3$ or more close to its theoretical density and a lattice constant of 8.240 Å or less can be obtained. This compound oxide is useful as the cathode electroactive material for lithium batteries, particularly as the cathode electroactive material for nonaqueous secondary batteries. Furthermore, by using this cathode electroactive material in a nonaqueous secondary battery including an anode comprising lithium, a lithium alloy or a material capable of doping or undoping lithium and a nonaqueous electrolyte containing a lithium salt, a highly practicable nonaqueous secondary battery having an initial capacity close to its theoretical capacity based on the composition of the cathode electroactive material can be obtained. The nonaqueous secondary battery thus prepared also exhibits a small reduction in capacity even when the charging and discharging cycles are repeated many times.

While the invention has been described in detail and with reference to specific embodiments thereof, it will be apparent to one skilled in the art that various changes and modifications can be made therein without departing from the spirit and scope thereof.

What is claimed is:

1. A method for producing a cathode electroactive material comprising a compound oxide having a spinel structure, said compound oxide comprising lithium, manganese and oxygen and having an atomic ratio of lithium to manganese of Li/Mn=0.48 to 0.55, a true density of 4.05 $g/cm^3$ or more and a lattice constant of 8.240 Å or less, which comprises mixing a lithium compound with manganese carbonate having a specific surface area of 10 $m^2/g$ or more, reacting the mixture at a temperature of from 350 to 680° C. for at least one hour, then crushing or pulverizing once, and heat-treating the resulting spinel structure compound oxide at a temperature of from 730 to 900° C.

2. The method for producing a cathode electroactive material as claimed in claim 1, wherein said compound oxide having a spinel structure has an atomic ratio of lithium to manganese of Li/Mn=0.51 to 0.55.

3. The method for producing a cathode electroactive material as claimed in claim 1, which comprises reacting said mixture of a lithium compound and manganese carbonate at a temperature of from 500 to 650° C. for from 2 to 40 hours, and heat-treating the resulting spinel structure compound oxide at a temperature of from 750 to 850° C. for from 5 to 30 hours.

4. The method for producing a cathode electroactive material as claimed in claim 2, which comprises reacting said mixture of a lithium compound and manganese carbonate at a temperature of from 500 to 650° C. for from 2 to 40 hours, and heat-treating the resulting spinel structure compound oxide at a temperature of from 750 to 850° C. for from 5 to 30 hours.

5. The method for producing a cathode electroactive material as claimed in claim 1, which further comprises the step of crushing the reaction product after reacting at a temperature of from 350 to 680° C. and prior to heat-treating at a temperature of from 730 to 900° C.

6. A nonaqueous secondary battery comprising an anode, a nonaqueous electrolyte and a cathode electroactive material comprising a compound oxide having a spinel structure, said compound oxide comprising lithium, manganese and oxygen and having an atomic ratio of lithium to manganese of Li/Mn=0.48 to 0.55, a true density of 4.05 g/cm$^3$ or more and a lattice constant of 8.240 Å or less, wherein said compound oxide having a spinel structure is prepared by a method which comprises mixing a lithium compound with manganese carbonate having a specific surface area of 10 m$^2$/g or more, reacting the mixture at a temperature of from 350 to 680° C. for at least one hour, and heat-treating the resulting spinel structure compound oxide at a temperature of from 730 to 900° C.

7. The nonaqueous secondary battery as claimed in claim 6, wherein said compound oxide having a spinel structure is prepared by a method which comprises reacting said mixture of a lithium compound and manganese carbonate at a temperature of from 500 to 650° C. for from 2 to 40 hours, and heat-treating the resulting spinel structure compound oxide at a temperature of from 750 to 850° C. for from 5 to 30 hours.

8. The nonaqueous secondary battery as claimed in claim 6, wherein said compound oxide having a spinel structure has an atomic ratio of lithium to manganese of Li/Mn=0.51 to 0.55.

9. The nonaqueous secondary battery as claimed in claim 6, wherein said compound oxide having a spinel structure has an atomic ratio of lithium to manganese of Li/Mn=0.51 to 0.53.

* * * * *